(12) United States Patent
Kolar et al.

(10) Patent No.: US 7,520,663 B1
(45) Date of Patent: Apr. 21, 2009

(54) ENCLOSURE FOR A FOOD PROCESSOR

(75) Inventors: David J. Kolar, Stow, OH (US); Robert M. Ulanski, Broadview Heights, OH (US)

(73) Assignee: Vita-Mix Corporation, Cleveland, OH (US)

( * ) Notice: Subject to any disclaimer, the term of this patent is extended or adjusted under 35 U.S.C. 154(b) by 584 days.

(21) Appl. No.: 11/200,111

(22) Filed: Aug. 10, 2005

(51) Int. Cl.
*B01F 15/00* (2006.01)
*A47J 44/00* (2006.01)
*A47J 43/04* (2006.01)

(52) U.S. Cl. ................................... 366/347; 312/326
(58) Field of Classification Search ............. 312/265.5, 312/265.6, 326; 310/89, 51; 366/347
See application file for complete search history.

(56) References Cited

U.S. PATENT DOCUMENTS

| | | | |
|---|---|---|---|
| D237,503 S | 11/1975 | Langmack, Jr. et al. ..... D26/5 R |
| 3,961,721 A * | 6/1976 | Gordon et al. ............... 220/230 |
| D249,870 S | 10/1978 | Tillander ..................... D9/224 |
| D295,012 S * | 4/1988 | Gelber ......................... D7/412 |
| 4,822,175 A | 4/1989 | Barnard et al. ............... 366/347 |
| 4,883,144 A * | 11/1989 | Haushalter et al. .......... 181/198 |
| D321,647 S | 11/1991 | Oldorf ..................... D9/432 X |
| 5,125,197 A * | 6/1992 | Fuchs ........................... 52/202 |
| 5,533,797 A | 7/1996 | Gelber ..................... 312/138.1 |
| 5,957,577 A * | 9/1999 | Dickson et al. ............. 366/197 |
| 6,019,238 A * | 2/2000 | Kindig et al. ............... 220/4.22 |
| D427,016 S * | 6/2000 | Kindig et al. ................ D7/412 |
| D432,864 S | 10/2000 | Kindig et al. ................ D7/412 |
| 6,497,463 B2 * | 12/2002 | Moretti ....................... 312/236 |
| D526,845 S * | 8/2006 | Katz et al. ................... D7/412 |
| 2004/0227437 A1* | 11/2004 | Newton et al. .............. 312/287 |

* cited by examiner

*Primary Examiner*—Tony G Soohoo
(74) *Attorney, Agent, or Firm*—Renner, Kenner, Greive, Bobak, Taylor & Weber

(57) ABSTRACT

An enclosure (10) includes a base member (13), a body portion (12) and a cover (11) pivotally attached to the base portion (12) by a hinge assembly (25). The body portion (12) is attached to the base member (13) by a magnet assembly (35). The magnet assembly (35) includes magnets (36) positioned in pockets (20) formed in a wall (15) of the base member (13), and a metallic strip (37) held in a wall (28) of the body portion (12) by a plate (38). The body portion (12) is also provided with lugs (34) to be received in openings (19) in the base member (13).

17 Claims, 4 Drawing Sheets

ENCLOSURE FOR A FOOD PROCESSOR

TECHNICAL FIELD

This invention relates to an enclosure such as those which house a food processor to deaden the noise emanating therefrom. More particularly, this invention relates to such an enclosure having a main body and a cover, wherein the cover is hinged to the main body and the main body is magnetically connected to the base of a food processor.

BACKGROUND ART

Enclosures for electric food processors or blenders are known in the art. One such enclosure is shown, for example, in U.S. Pat. No. Des. 427,016. Such is utilized to house a conventional electric blender so that when the blender is in operation, the noise emanating therefrom will be muffled. Such is particularly desirable when the blender is being operated in a commercial environment, such as a restaurant or cocktail lounge, so that the customers are not annoyed by the sound of the blender which is processing a beverage.

Most typical enclosures are formed of two components, that is, a main body and a cover. Usually the cover is hingedly attached to the main body, and the main body is attached to the base of the blender by a plurality of fasteners. As such, when the container of the blender is positioned on the base, it may be accessed by pivoting the cover relative to the main body.

Because it is associated with food products, the enclosure must be frequently cleaned. To do so, some enclosures, such as that shown in U.S. Pat. No. 6,019,238, allow the cover to be totally removed from the main body by means of an easy disconnection of the hinge. However, the main body still needs to be disconnected from the blender base which normally requires the manual manipulation of several fasteners which not only is time consuming, but which also, after frequent manipulations, causes wearing of the parts such that a sturdy connection can no longer be maintained.

Thus, the need exists for an enclosure which can easily and quickly be disassembled and yet, when assembled, provide a consistently sturdy connection.

DISCLOSURE OF THE INVENTION

It is thus an object of the present invention to provide an enclosure for the container of a food processor which can be readily assembled and disassembled.

It is another object of the present invention to provide an enclosure, as above, which is sturdily connected when assembled These and other objects of the present invention, as well as the advantages thereof over existing prior art forms, which will become apparent from the description to follow, are accomplished by the improvements hereinafter described and claimed.

In general, an enclosure includes a base member, a body portion, and a magnet assembly attaching the body portion to the base member. The magnet assembly includes a magnet carried by one of the body portion or the base member and a metallic member carried by the other of the body portion or the base member.

In accordance with another aspect of the invention, an enclosure includes a body portion, a cover hingedly attached to the body portion, and a base member. The base member has at least one pocket and a magnet is positioned in the pocket. A metallic strip is carried by the body portion and is adjacent to the magnet so that the body portion is attached to the base member.

In another aspect of the invention, an enclosure is provided for the container of a blender. The enclosure includes a blender base member which is adapted to carry the container. A body portion has a cover connected thereto, and a magnet assembly attaches the body portion to the base member.

A preferred exemplary enclosure made according to the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
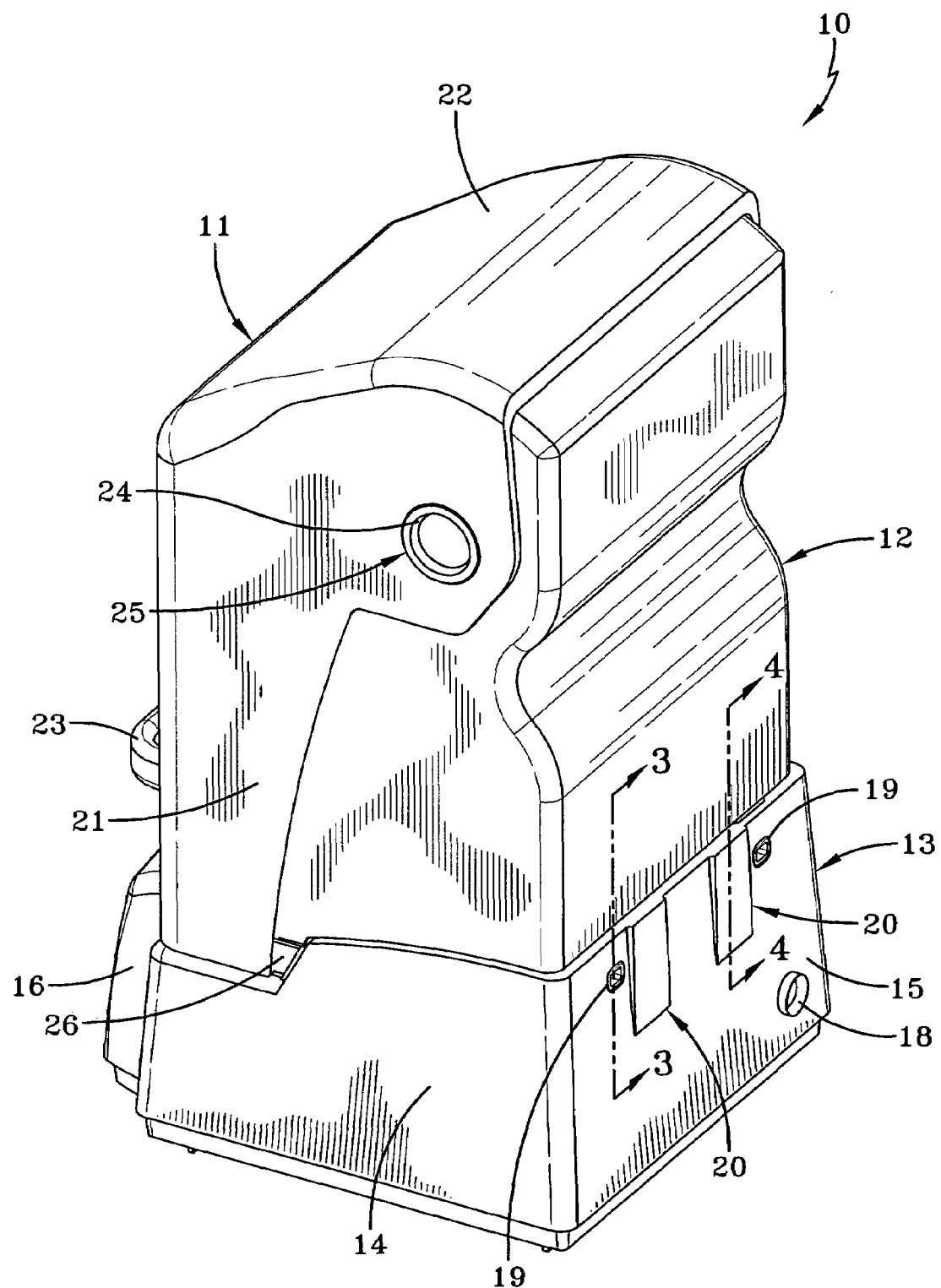
FIG. 1 is a perspective view of an enclosure for a food processor made in accordance with the concepts of the present invention.

An enclosure made in accordance with the present invention is indicated generally by the numeral 10 and includes a cover, generally indicated by the numeral 11, and a body portion generally indicated by the numeral 12. Enclosure 10 is designed to be attached to a base member, generally indicated by the numeral 13, which can be the base (or a portion thereof) of a blender, the base 13 housing a motor which operates the blender. As such, the container of the blender is positioned on the base member 13 and housed within enclosure 10 to muffle the noise generated by the operation of the blender. Cover 11 and body portion 12 are preferably made of a clear thermoplastic material, such as polycarbonate or polyester, so that the container of the blender positioned on base member 13 can be viewed.

Figure 3:
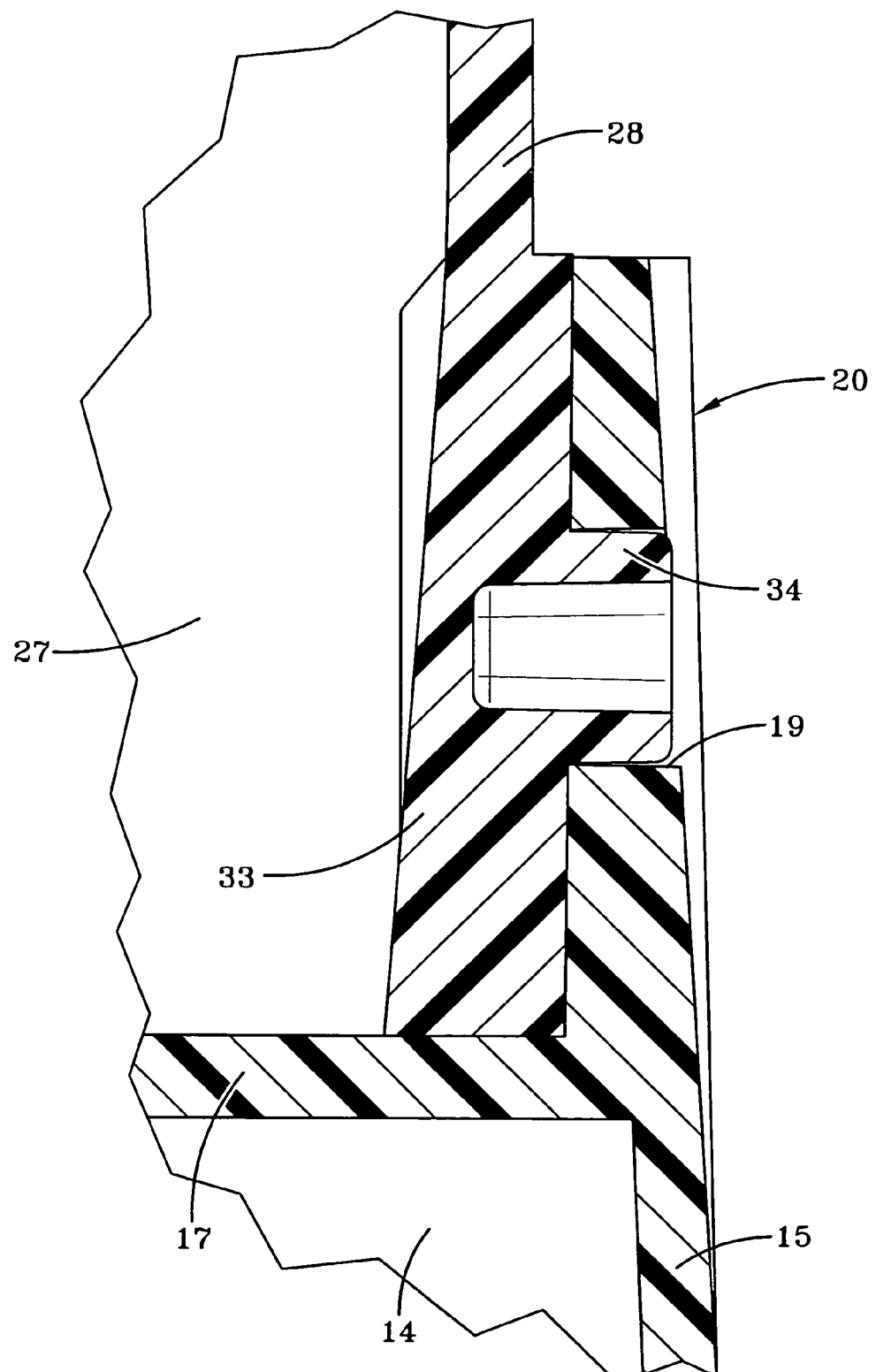
FIG. 3 is an enlarged, fragmentary, sectional view taken substantially along line 3-3 of FIG. 1.

Base member 13 is shown as including opposed side walls 14 connected at one end by a rear wall 15 and at the other end by a front wall 16. A top surface 17 (FIGS. 3 and 4) of base member 13 extends from an intermediate portion of rear walls 15 to front walls 16 and extends between side walls 14. If base member 13 is an operating portion of a blender, front wall 16 often includes a control panel. In addition, rear wall 15 is, in that instance, provided with an opening 18 through which an electric cord may pass to provide power to a blender motor positioned below top surface 17. As will hereinafter be described in more detail, rear wall 15 is also provided with a pair of spaced openings 19 and a pair of spaced pockets generally indicated by the numeral 20.

Cover 11 of enclosure 10 includes opposed side walls 21 (one shown) spanned by a top wall 22 which forms the top of enclosure 10. A front wall (not shown) spans side walls 21 and carries a handle 23. Cover 11 has an open rear area opposed to the front wall. Side walls 21 are provided with openings 24 which are part of a hinge assembly generally indicated by the numeral 25. Cover 11 is thus pivotable with respect to body portion 12, and handle 23 conveniently assists in the opening and closing of enclosure 10. Tabs 26 extend rearwardly from the bottom of side walls 21 to locate cover 11 relative to body portion 12 as will be hereinafter described.

Figure 2:
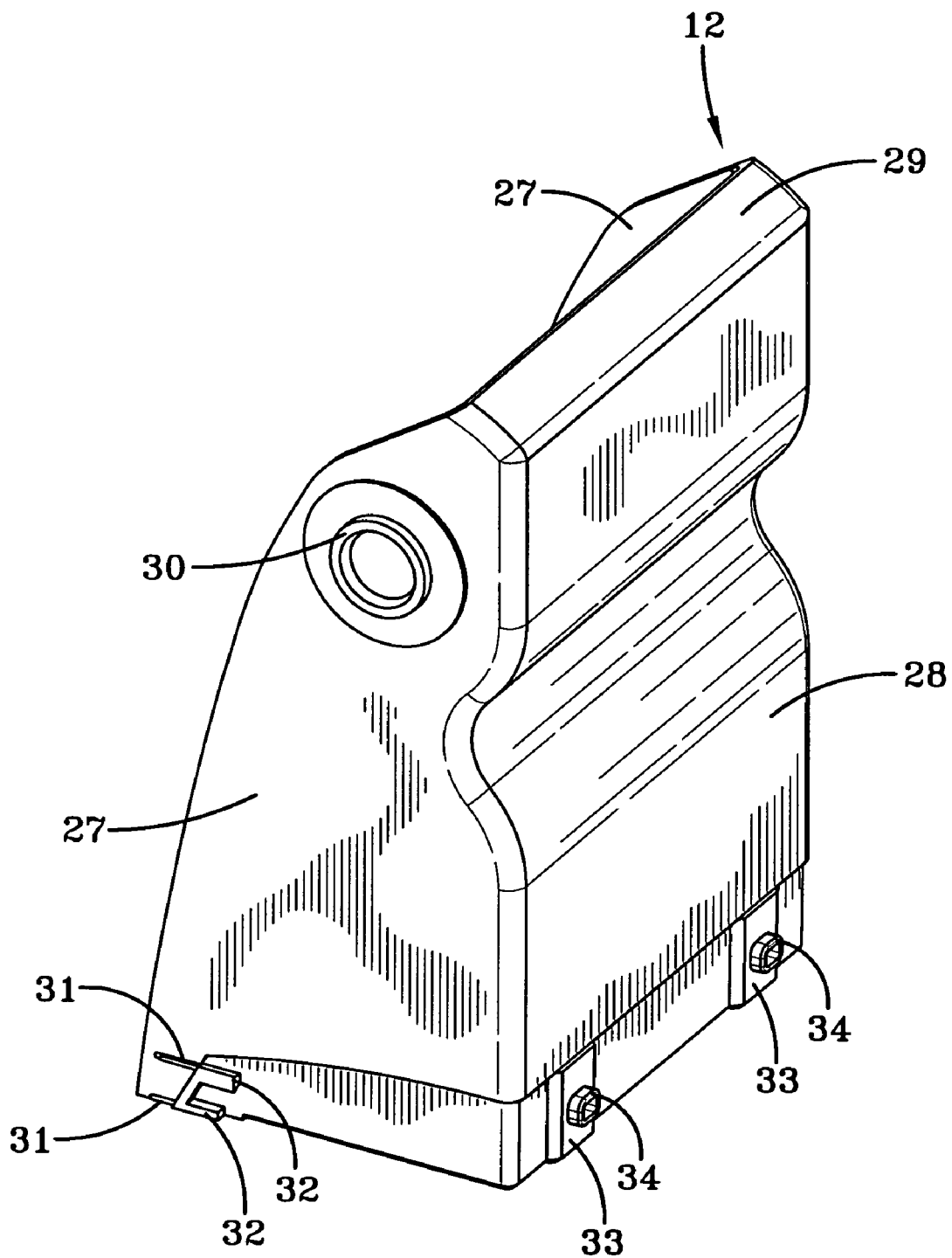
FIG. 2 is a perspective view of the body component of the enclosure shown in FIG. 1.

As best shown in FIG. 2, body portion 12 includes opposed side walls 27 spanned by a rear wall 28 and an abbreviated top wall 29. Body portion 12 has an open front area opposed to rear wall 28, which front area is closed by cover 11 to form enclosure 10. Side walls 27 include sockets 30 which are received within cover openings 24 to form hinges 25. Cover 11 is thus pivotable, as previously described, from an open to a closed position on an axis defined by sockets 30. Top wall 22 of cover 11 thus overlies a portion of top wall 29 of body portion 12. When cover 11 is closed in the FIG. 1 position, tabs 26 can dovetail between ribs 31 formed at the bottom of side walls 27 of body portion 12. Similarly, when body portion 12 is slid relative to base 13, tabs (not shown) on base 13 slide between dovetail ribs 32 formed on side walls 27 opposite to ribs 31.

The lower end of rear walls 28 of body portion 12 includes spaced platforms 33 which carry locator lugs 34. When body portion 12 is attached to base member 13, lugs 34 extend through openings 19 in the rear wall 15 of base member 13. Thus, body portion 12 is aligned with base member 13 at the front by the dovetail connection with ribs 32, and at the rear by lugs 34 and openings 19.

Figure 4:
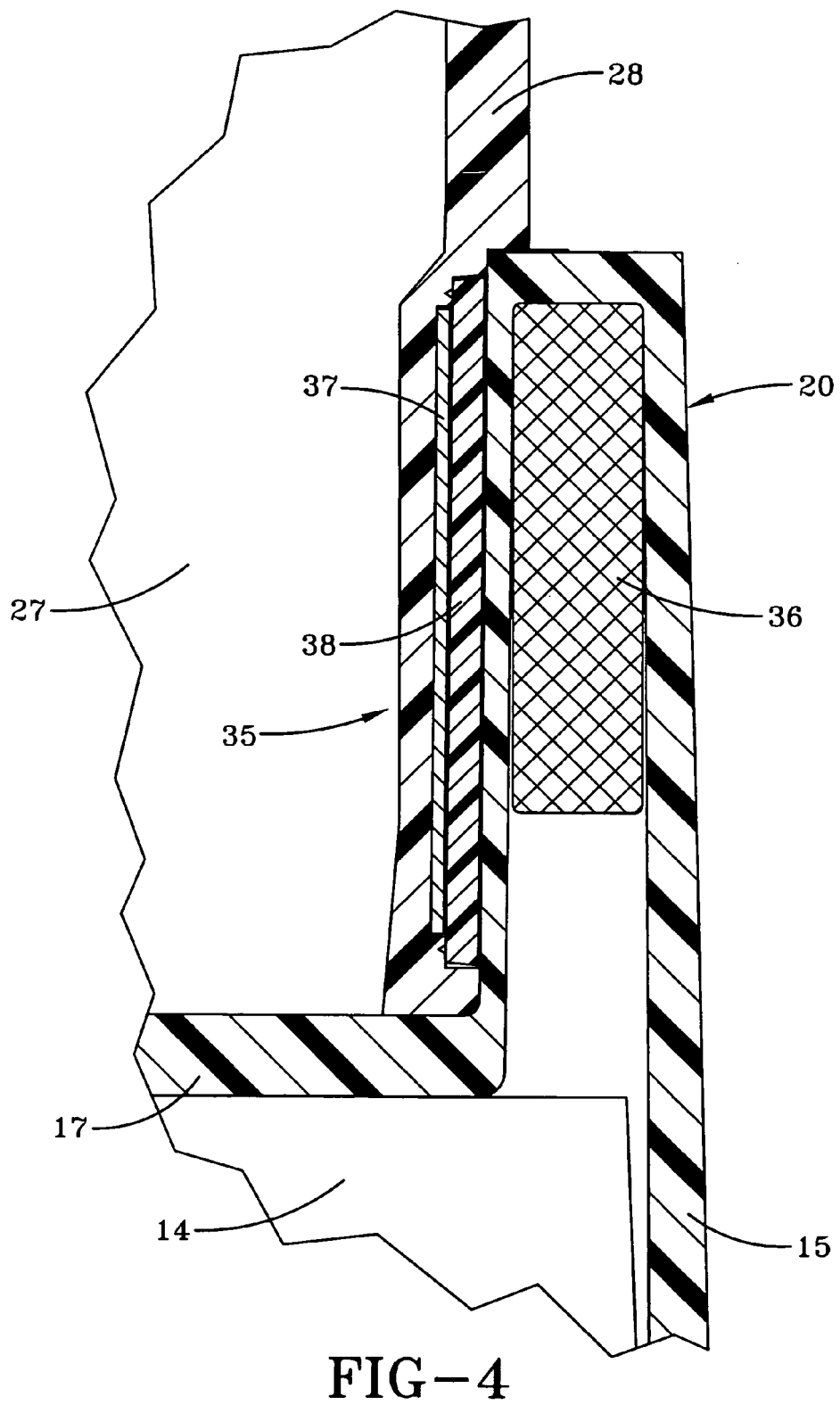
FIG. 4 is an enlarged, fragmentary, sectional view taken substantially along line 4-4 of FIG. 1.

Body portion 12 is held to base member 13 by a magnetic assembly generally indicated by the numeral 35 and shown in FIG. 4. Assembly 35 includes a magnet 36 preferably mounted in each pocket 20 of base member 13. A metallic strip 37 generally extends between platforms 33 of body portion 12 and is held in place by a plastic cover plate 38 which can be sonically welded to rear wall 28 of body portion 12.

As such, when body portion 12 is attached to base member 13, as previously described, the attraction between magnets 36 and strip 37 hold the assembly in place. But the magnetic force of assembly 35 can be easily overcome to separate body portion 12 from base member 13 for ease of cleaning and the like. It should be appreciated that the magnetic material could be positioned in body portion 12 and the metallic material positioned in base member 13 without departing from the concepts of the present invention.

It is thus evident that an enclosure constructed as described herein accomplishes the objects of the present invention and otherwise substantially improves the art.

What is claimed is:

1. An enclosure comprising a base member, a body portion, a cover, a hinge assembly permitting pivotal movement of said cover relative to said body portion, said cover including tabs and said body portion including pairs of spaced ribs, a said tab being received between a said pair of spaced ribs when said cover is closed on said body portion, and a magnet assembly attaching said body portion to said base member, said magnet assembly including a magnet carried by one of said base member or said body portion, and a metallic member carried by the other of said base member or said body portion.

2. The enclosure of claim 1 wherein said base member has at least one pocket, said magnet being received in said pocket.

3. The enclosure of claim 2 wherein said metallic member includes a strip of material, and further comprising a plate to attach said strip of material to said body portion.

4. An enclosure comprising a base member, a body portion, said body portion having opposed side walls and said base member having opposed side walls, a dovetail connection between said side walls of said body portion and said side walls of said base member, and a magnet assembly attaching said body portion to said base member, said magnet assembly including a magnet carried by one of said base member or said body portion, and a metallic member carried by the other of said base member or said body portion.

5. An enclosure comprising a base member, a body portion, said body portion having a wall with spaced lugs, said base member having a wall with spaced openings, said lugs being received in said openings, a platform carrying each said lug, and a magnet assembly attaching said body portion to said base member, said magnet assembly including a magnet carried by one of said base member or said body portion, and a metallic member carried by the other of said base member or said body portion, wherein said metallic member is positioned between said platforms.

6. The enclosure of claim 5 further comprising a plate to maintain the position of said metallic member.

7. The enclosure of claim 6 wherein said base member has at least one pocket, and said magnet is received in said pocket, said pocket being adjacent to said metallic member.

8. An enclosure comprising a body portion, a cover hingedly connected to said body portion, a base member, said body portion having opposed side walls and said base member having opposed side walls, a dovetail connection between said side walls of said body portion and said side walls of said base member, said base member having at least one pocket, a magnet positioned in said pocket, and a metallic strip carried by said body portion, said metallic strip being adjacent to said magnet so that said body portion can be attached to said base member.

9. An enclosure comprising a body portion, a cover hingedly connected to said body portion, said cover including tabs and said body portion including pairs of spaced ribs, a said tab being received between a said pair of spaced ribs when said cover is closed on said body portion, a base member, said base member having at least one pocket, a magnet positioned in said pocket, and a metallic strip carried by said body portion, said metallic strip being adjacent to said magnet so that said body portion can be attached to said base member.

10. The enclosure of claim 9, said body portion having opposed side walls and said base member having opposed side walls, and further comprising a dovetail connection between said side walls of said body portion and said side walls of said base member.

11. An enclosure comprising a body portion, a cover hingedly connected to said body portion, a base member, said body portion having a wall with spaced lugs, said base member having a wall with spaced openings, said lugs being received in said openings, said base member having at least one pocket, a magnet positioned in said pocket, and a metallic strip carried by said body portion, said metallic strip being adjacent to said magnet so that said body portion can be attached to said base member.

12. The enclosure of claim 11, each said lug being carried by a platform, said metallic strip being positioned between said platforms, and further comprising a plate to maintain the position of said metallic strip.

13. An enclosure for the container of a blender comprising a blender base adapted to carry the container, a body portion positioned above said base, a cover connected to said body portion, said cover including tabs and said body portion including pairs of spaced ribs, a said tab being received between a said pair of spaced ribs when said cover is closed on said body portion, and a magnet assembly attaching said body portion to said base.

14. The enclosure of claim 13 wherein said base has at least one pocket and said magnet assembly includes a magnet positioned in said pocket.

15. The enclosure of claim 14 wherein said magnet assembly includes a strip of metallic material, and a plate to maintain said metallic material on said body portion.

16. An enclosure for the container of a blender comprising a blender base adapted to carry the container, a body portion positioned above said base, a cover connected to said body portion, said body portion having opposed side walls and said base having opposed side walls, a dovetail connection between said side walls of said body portion and said side walls of said base, and a magnet assembly attaching said body portion to said base.

17. The enclosure of claim 13, said body portion having a wall with spaced lugs, said base having a wall with spaced openings, said lugs being received in said openings.

* * * * *